C. Williams.
Wood Pavement.

No. 3,554. Reissued Jul. 13, 1869.

Witnesses;
Gustav Berg
Alfred A Reilly

Inventor;
C. Williams per
Van Santvoord & Hecht
Attys

N. PETERS, PHOTO-LITHOGRAPHER, WASHINGTON, D. C.

United States Patent Office.

C. WILLIAMS, OF NEW YORK, N. Y.

*Letters Patent No.* 80,261, *dated July* 21, 1868; *reissue No.* 3,554, *dated July* 13, 1869.

IMPROVED WOODEN PAVEMENT.

The Schedule referred to in these Letters Patent and making part of the same.

*To all whom it may concern:*

Be it known that I, C. WILLIAMS, of the city, county, and State of New York, have invented a new and improved Pavement; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

This invention consists in the arrangement of wedge-shaped keys, in combination with pavement-blocks, of wood or other material, in such a manner, that by said wedge-shaped keys, the blocks, or parts of the blocks, (in case one of the blocks should split,) are effectually retained in position, and prevented from rising up or settling down.

It consists also in the arrangement of an elastic or yielding bed, in combination with the rigid sub-bed of asphaltum, or other concrete, or other material, and with the wooden pavement-blocks, in such a manner, that by said elastic bed the noise and the trembling-motion produced by heavy vehicles passing over the pavement are deadened and obviated, the wear of the blocks is materially decreased, and said blocks are prevented from splitting and settling individually, or in groups, and a strong and durable pavement is produced.

A represents a pavement-block, which, by preference, is made of wood, but which may be made of any other suitable material.

This block is provided with dovetailed or L-shaped rebates, extending all around on its edges to about the middle of its depth, (more or less,) so that when two blocks are placed together, wedge-shaped grooves are formed to receive the wedge-shaped keys *a*.

These keys are, by preference, produced of asphaltum, or other cement, which can be melted and poured into the grooves after the blocks have been adjusted; or they may be made of wood, or other suitable material.

I make the keys dovetailed or wedge-shaped, as shown, so that the same effectually prevent the blocks from rising or from settling, for, if it is attempted to raise a block, the key opposes the motion, and the same, if it is attempted to depress a block, and before the keys have been crushed or split or removed, the block cannot be displaced up or down.

I also produce transverse or longitudinal (either or both) grooves in the faces or upper surfaces of the blocks, and these blocks are made dovetailed, or wedge-shaped, and of a depth equal to the wedge-shaped rebates on the edges.

These dovetailed or wedge-shaped grooves are intended to receive keys *a**, of cement, wood, or other suitable material, and they serve not only to give a firm hold to the horses' feet, but they also retain the pieces of a block, in case the same should split, and prevent said pieces from settling down or from rising.

Figure 1:
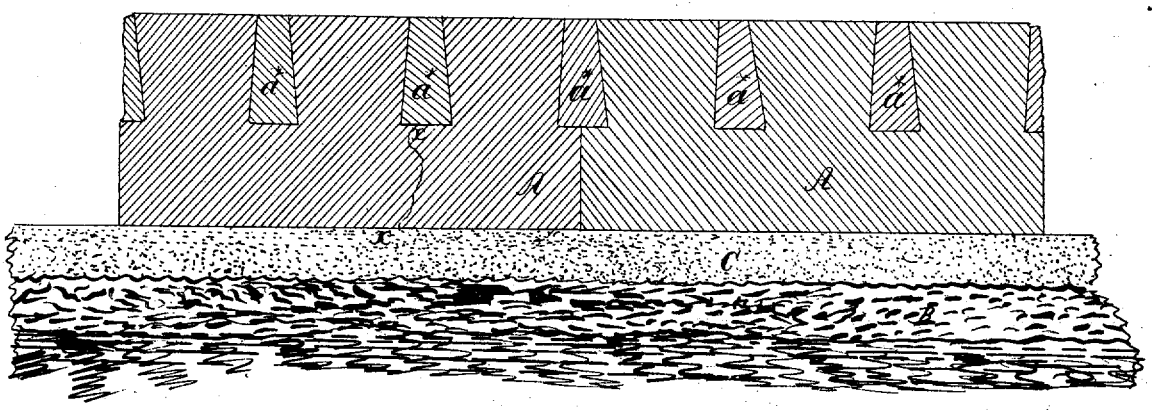
Figure 1 represents a longitudinal vertical section of this invention.
Figure 2:
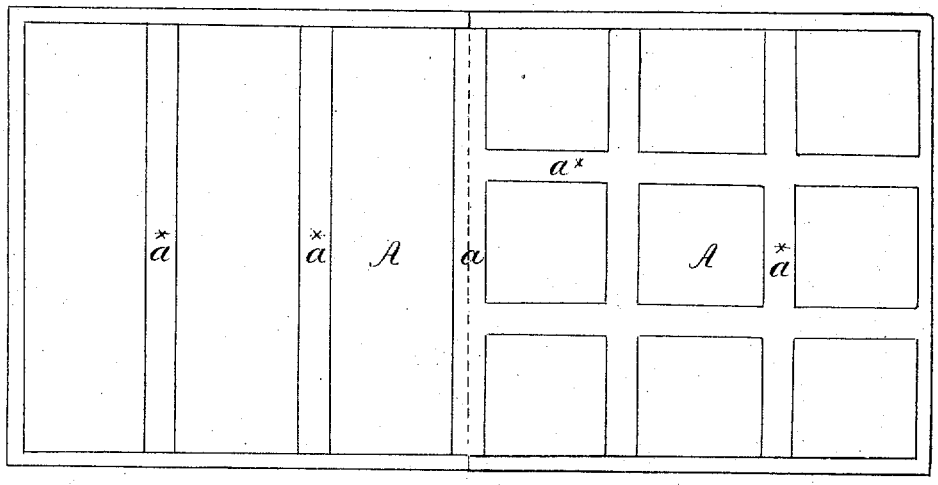
Figure 2 is a plan or top view of the same.

If one of the blocks should split, for instance, in the line *x x*, fig. 1, neither of the parts could rise or settle without splitting the wedge-shaped key.

This effect is produced whether the keys are in the top of the blocks, as shown in the drawing, or whether they are placed at the bottom of said blocks.

In putting down my pavement, I make an excavation of the proper depth, and then I prepare a sub-bed, B, of gravel and asphaltum, or other concrete, or of boards, or other material, and on this sub-bed I place a bed, C, of sand.

After this bed has been rolled to a uniform thickness, I put down the wooden blocks with close joints, and, if desired, said blocks may be connected by keys, as previously described.

By these means a pavement is obtained which is capable of resisting the influence of rain, or of changes in the temperature; the blocks are not liable to become displaced either singly or in groups, and the noise and trembling motion generally produced by heavy vehicles passing over the pavement are deadened by the elastic bed, and thereby my pavement is rendered more durable and more convenient than a pavement in which the wooden blocks are put down directly upon a rigid bed.

I do not, in this application, claim broadly the arrangement of keys between adjoining blocks; but

What I claim as new, and desire to secure by Letters Patent, is—

1. The dovetailed or wedge-shaped keys *a* or *a**, in combination with the blocks A, substantially as and for the purpose described.

2. The intermediate elastic bed C and sub-bed B, in combination with the wooden blocks A, substantially as and for the purpose set forth.

This specification signed by me, this 8th day of May, 1869.

C. WILLIAMS.

Witnesses:
W. HAUFF,
E. F. KASTENHUBER.